United States Patent Office 3,565,835
Patented Feb. 23, 1971

3,565,835
USE OF AMMONIUM SULFATE AS A NUCLEATING AGENT IN THE PRODUCTION OF EXPANDED PLASTICS
Heinz Weber, Rolf Moeller, and Hans Hintz, Ludwigshafen, Germany, assignors to Badische Anilin- & Soda-Fabrik Aktiengesellschaft, Ludwigshafen (Rhine), Germany
No Drawing. Filed Feb. 17, 1969, Ser. No. 799,930
Claims priority, application Germany, Feb. 23, 1968,
P 16 69 758.8
Int. Cl. C08f 29/02, 47/10
U.S. Cl. 260—2.5    4 Claims

ABSTRACT OF THE DISCLOSURE

The use of ammonium sulfate as a nucleating agent in the production of expanded polystyrene plastics.

---

This invention relates to the use of ammonium sulfate as a nucleating agent in the production of expanded plastics.

Many nucleating agents have been recommended for the production of expanded plastics based on styrene polymers. Ammonium bromide is used in an amount of from 2 to 10% by weight according to British patent specification No. 1,013,378. A disadvantage of this method is the high content of salt in the expanded plastics obtained.

An addition of from 2 to 3% by weight of water is recommended in British patent specification No. 773,125. It is a disadvantage of this method that the mixture has to be processed immediately after it has been made.

For the production of expanded plastics based on polystyrene U.S. Patent specification No. 2,911,382 recommends an addition of from 0.2 to 2% by weight of a hydrated salt which eliminates water at a temperature of from 50° to 200° C. A very irregular foam structure is obtained when such a nucleating agent is used.

British patent specification No. 903,564 describes a process for the production of expanded plastics based on styrene polymers in which a hydrated inorganic salt which eliminates its water of crystallization is used as an expanding agent. Additional nucleating agents such as aluminum oxide, calcium carbonate, calcium silicate and other finely divided inorganic substances may be used in this method. Only expanded plastics having a density of more than 0.2 g./cm.$^3$ are obtained by this method.

Chemical expanding agents, in the absence or presence of nucleating agents such as metal stearates or hydrated inorganic solids are used in British patent specification No. 964,291 for the production of expanded plastics based on polystyrene. Only expanded plastics having a density of more than 0.3 g./cm.$^3$ are obtained by this method.

The addition of ammonium salts of carboxylic acids as nucleating agents is described in German patent specification No. 1,144,911. The mean pore size obtained in this method is however unsatisfactory. The process has therefore not been adopted in practice.

The object of the present invention is the production of styrene polymers capable of being stored which can be expanded to give foamed plastics having a density of less than 0.1, a low salt content and a uniform, very fine cellular structure.

We have now found that it is advantageous in the production of expanded plastics based on styrene polymers to use ammonium sulfate in an amount of from 0.0001 to 1% by weight (with reference to styrene polymer) as a nucleating agent.

Expanded plastics which have been prepared using ammonium sulfate as nucleating agent have a uniform and fine cellular structure which has not hitherto been achieved. The size of the cells is generally less than 0.1 mm., i.e. there are more than ten cells per mm. In addition to this favorable property, the expanded plastics require only short residence times in molding. When expandable individual particles are prepared, these are substantially insensitive to thermal influences. This means for example that particles prepared according to this invention can be dried at temperatures which in all other cases would result in a coarse and irregular cell structure.

Ammonium sulfate is suitable as a nucleating agent for all expanded plastics based on conventional styrene polymers. Examples of suitable styrene polymers are polystyrene and copolymers of styrene with other $\alpha,\beta$-unsaturated polymerizable compounds which contain at least 50% by weight of polymerized styrene units. Examples of such $\alpha,\beta$-unsaturated polymerizable compounds are $\alpha$-methylstyrene, nuclear halogenated styrenes, nuclear alkylated styrenes, acrylonitrile, esters of acrylic and/or methacrylic acid with alcohols having one to eight carbon atoms and N-vinyl compounds such as vinylcarbazole. Compounds having two polymerizable double bonds such as butadiene, divinylbenzene and butanediol diacrylate may also be used as comonomers, these generally being used only in small amounts, for example from 0.01 to 0.1% by weight.

The styrene polymers may contain conventional additives such as dyes or conventional flame retardants such as trisdibromopropyl phosphate, brominated butadiene oligomers such as hexabromocyclododecane, chloroparaffins, if desired mixed with synergists for these flame retardants, such as complex metal compounds or substances which only decompose at high temperatures, for example organic peroxides or hydrocarbons decaying into free radicals such as diamyl. Mineral additives such as talc, phosphates, or organic diluents, as for example citric acid, may also be added.

An expanding agent is added to the styrene polymers for the production of expanded plastics. Conventional expanding agents are for example organic compounds which are gaseous or liquid under normal conditions and have boiling points which are lower than the softening point of the styrene polymer, preferably hydrocarbons or halohydrocarbons such as propane, butane, pentane, cyclopentane, hexane, cyclohexane, dichlorodifluoromethane and/or trifluorochloromethane or tetrachloroethylene. These expanding agents are generally contained in the styrene polymers in amounts of from 3 to 15% by weight with reference to the polymer.

Ammonium sulfate is used as a nucleating agent in accordance with the present invention. The amounts used are usually from 0.0001 to 1%, preferably from 0.0005 to 0.5%, particularly from 0.001 to 0.5%, by weight with reference to the styrene polymer. The ammonium sulfate should be used in as finely divided a form as possible. Advantageous results are achieved when the greater portion (i.e. more than 50% and particularly more than 90%) of the ammonium sulfate is dispersed in the expandable mixture in a particle size of less than 50 microns, particularly of from 0.02 to 10 microns. Extremely finely powdered ammonium sulfate may be used as starting material and mixed with styrene polymer and expanding agent. It is also possible to start from coarse ammonium sulfate and to subject it to size reduction during mixing with the styrene polymer. It is also possible to mix an ammonium sulfate solution, for example an aqueous solution, intensely with the styrene polymer and then if necessary to remove the solvent or a part of the same, for example by evaporation.

It is advantageous to use not only ammonium sulfate but also a small amount of water, for example 0.1 to 1.5%, particularly 0.5 to 1%, by weight with reference to the styrene polymer. An amount of water of this order is often already present in the pores of the styrene polymer used as a result of the manufacturing process. It is also possible however to add water when mixing the components if an anhydrous styrene polymer is used. Favorable results are obviously also achieved in the absence of water.

The ammonium sulfate may be mixed in various ways with the styrene polymer and the expanding agent. For example it is possible to carry out the production of the styrene polymer (polymerization) in the presence of expanding agent and/or ammonium sulfate. When styrene is polymerized in aqueous suspension, the ammonium sulfate may for example simply be dissolved in the aqueous phase. The beads obtained are processed in the conventional manner. Advantageous results are achieved even with very small amounts of ammonium sulfate. It is generally adequate to use solutions containing only 0.1 to 5% by weight of ammonium sulfate. The polystyrene beads obtained in this case contain from about 0.1 to 2% by weight of the aqueous phase. The styrene polymer, expanding agent and ammonium sulfate may however also be mixed at a temperature above the softening point of the polymer and at a pressure which is above the vapor pressure of the expanding agent at this temperature in a mixing apparatus, for example in an extruder. To produce an expandable product which is capable of being transported and stored it is advantageous to cool the mixture after the components have been mixed and to comminute it if required. During this processing provision is made by choosing an appropriate pressure and temperature that no expansion of the mixture takes place. Expendable styrene polymers capable of being stored and transported advantageously contain 0.001 to 1% by weight of ammonium sulfate with reference to the styrene polymer. In this case the superiority of ammonium sulfate over known nucleating agents is very clearly demonstrated: amounts of 0.1% and less of ammonium sulfate make it possible to produce unexpanded particles capable of being transported which, after they have been expanded, for example with steam, give finely cellular foam having a cell size of 0.05 mm. In contrast to this, it is not possible in the case of prior art nucleating agents, as for example talc, to obtain unexpanded particles which will later give finely cellular foam products.

The styrene polymers containing expanding agent and ammonium sulfate obtained by the process according to this invention may be processed by conventional methods into expanded plastics, for example by heating to a temperature above the softening point of the styrene polymer at a pressure which is less than the vapor pressure of the expanding agent at this temperature, for example at atmospheric pressure. By carrying out the shaping process at this temperature and then cooling, any desired moldings, such as boards, blocks, sheeting and the like, may be prepared. The product may also be processed into expanded plastics by the extrusion method.

It is furthermore possible for the pressure to be released immediately after the styrene polymer, expanding agent and ammonium sulfate have been mixed so that the melt obtained expands. In this case it is advantageous for the mixture to contain from 0.001 to 1% by weight of ammonium sulfate. For example the components may be mixed in the extruder and expanded plastics boards, sheeting or the like immediately prepared by extrusion through a die of appropriate shape or expanded plastics moldings of any shape obtained by using a conventional injection molding machine.

The use of the new nucleating agent is illustrated by the following examples. The parts specified are parts by weight.

EXAMPLE 1

10,000 parts per hour of polystyrene granules having a particle size of 2.5 mm. and a K value of 62 are melted in an extruder. During each hour, 600 parts of pentane and a solution of 4 parts of ammonium sulfate in 80 parts of water are metered into the polystyrene melt. The material issuing from the extruder die is immediately cooled and granulated into particles having an average size of 1.5 mm. When these are expanded in steam, particles having a diameter of 4 to 5 mm., a uniform foam structure and a cell size of 0.08 mm. are obtained. When the cells are counted under a microscope, the value determined is about twelve cells per mm.

EXAMPLE 2

10,000 parts of polystyrene granules having a size of 2.5 mm. are powdered in a mixing apparatus with ammonium sulfate having a maximum particle size of 50 microns. 600 parts of pentane is added to the granules thus treated in an extruder and the melt is extruded as in Example 1, cooled and granulated. The table shows the size of the cells of the expanded plastic obtained after expansion in steam with the amounts of ammonium sulfate indicated:

| Test | Parts of ammonium sulfate per 10,000 parts of polystyrene | Cells per mm. |
| --- | --- | --- |
| a | 0 | 3 |
| b | 5 | 12 |
| c | 8 | 15 |

COMPARATIVE EXAMPLES 3–10

The procedure of Example 2 is followed but other substances known from the literature are used instead of ammonium sulfate as nucleating agents. Using an amount of nucleating agent corresponding to that in Example 2 (5 parts per 10,000, equivalent to 0.05%), a similarly fine cellular structure is not obtained in any case.

| Example | Nucleating agent | Cells per mm. |
| --- | --- | --- |
| 3 | Ammonium bromide | 6 |
| 4 | Water | 3 |
| 5 | Ammonium oxalate (monohydrate) | 5 |
| 6 | Sodium sulfite | 6 |
| 7 | Aluminum sulfate (octadecahydrate) | 4 |
| 8 | α-Alanine | 8 |
| 9 | Diammonium citrate | 4 |
| 10 | Sodium hydrogen sulfate | 3 |

EXAMPLE 11

The procedure of Example 2 is followed but 10,000 parts of a copolymer of styrene with 20% of α-methylstyrene having a K value of 60 is used. An expanded material having more than ten cells per mm. can be prepared using 20 parts of ammonium sulfate as nucleating agent.

EXAMPLE 12

0.6 part of polyvinyl pyrrolidone having a K value of 90 (as protective colloid), 0.1 part of ammonium sulfate and 0.2 part of sodium pyrophosphate are dissolved in 200 parts of water in a stirred vessel. 100 parts of styrene (in which 7.5 parts of pentane, 0.55 part of dibenzoyl peroxide and 7 parts of polystyrene have been dissolved) is added. The whole is heated while stirring to 70° C. during twenty hours and kept at 85° C. for another fifteen hours. The polystyrene beads containing expanding agent are separated, washed and dried as indicated in the following table. The product has an ammonium sulfate content of 0.0005% by weight. The water content is determined on part of the polystyrene beads. Another part of the polystyrene beads containing expanding agent is expanded by the action of steam. The cellular structure is evaluated by cutting expanded plastics beads and counting the number of cells per mm.

In a comparative batch, the same procedure is followed but without ammonium sulfate in the aqueous phase.

The following abbreviations are used in the table:

WC=water content of unexpanded beads in percent by weight
CS=cellular structure of expanded beads (cells per mm.)
Nature=nature of cellular structure

TABLE

| | WC | CS | Nature |
|---|---|---|---|
| With ammonium sulfate: | | | |
| Dried at 20° C. for half an hour | 0.8 | 7.5 | Uniform. |
| Dried at 40° C. for three hours | 0.2 | 8.0 | Do. |
| Comparative test without ammonium sulfate: | | | |
| Dried at 20° C. for half an hour | 0.9 | 6.0 | Nonuniform. |
| Dried for three hours at 40° C | 0.2 | 5.5 | Do. |

The expanded polystyrene beads from the batch with ammonium sulfate have a uniform fine cellular structure which is not made coarser by drying at higher temperature. In contrast to this, expanded polystyrene beads from a batch without ammonium sulfate is less finely cellular and undergoes coarsening of the cellular structure at higher drying temperatures.

We claim:
1. A starting material for the production of expanded plastics comprising a styrene polymer, an expanding agent and from 0.0001 to 1% by weight (with reference to the styrene polymer) of ammonium sulfate as a nucleating agent.
2. A method of preparing finely cellular expanded styrene polymers wherein expansion is carried out in the presence of from 0.0001 to 1% (with reference to the styrene polymer) of ammonium sulfate as a nucleating agent.
3. A starting material as claimed in claim 1 which contains 0.0005 to 0.5% by weight of ammonium sulfate as nucleating agent.
4. A starting material as claimed in claim 1 which contains 0.001 to 0.5% of ammonium sulfate as nucleating agent.

References Cited
UNITED STATES PATENTS 3,072,584   1/1963   Karpovich _____ 260—2.5(E)
3,485,774   12/1969   McKenica _____ 260—2.5(E)

SAMUEL H. BELCH, Primary Examiner
W. J. BRIGGS, SR., Assistant Examiner

U.S. Cl. X.R.
260—33.6, 41, 93.5